(12) United States Patent
Luan et al.

(10) Patent No.: US 12,449,791 B2
(45) Date of Patent: Oct. 21, 2025

(54) REAL-TIME PREDICTION AND REGULATION METHODS AND SYSTEMS OF PRODUCT QUALITY BASED ON PROCESS DYNAMIC PATTERN

(71) Applicant: JIANGNAN UNIVERSITY, Wuxi (CN)

(72) Inventors: Xiaoli Luan, Wuxi (CN); Niannian Zheng, Wuxi (CN); Haiying Wan, Wuxi (CN); Shunyi Zhao, Wuxi (CN); Yuqing Ni, Wuxi (CN); Fei Liu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 395 days.

(21) Appl. No.: 18/164,822

(22) Filed: Feb. 6, 2023

(65) Prior Publication Data

US 2024/0028016 A1 Jan. 25, 2024

(30) Foreign Application Priority Data

Jul. 14, 2022 (CN) .......................... 202210826869.6

(51) Int. Cl.
*G05B 19/418* (2006.01)
(52) U.S. Cl.
CPC .............................. *G05B 19/41875* (2013.01)
(58) Field of Classification Search
CPC ............ G05B 19/418; G05B 19/41875; G05B 2219/32194; G05B 2219/32201

USPC .......................................................... 700/108
See application file for complete search history.

(56) References Cited

U.S. PATENT DOCUMENTS

| | | | |
|---|---|---|---|
| 2012/0124535 A1* | 5/2012 | Xiong | G01R 31/31718 716/111 |
| 2017/0123411 A1* | 5/2017 | Cheng | G06N 7/01 |
| 2019/0018397 A1* | 1/2019 | Shiba | G05B 19/41865 |

* cited by examiner

*Primary Examiner* — Jigneshkumar C Patel
(74) *Attorney, Agent, or Firm* — SZDC Law PC

(57) ABSTRACT

The invention provides real-time prediction and regulation methods and systems of product quality based on a process dynamic pattern. The prediction method includes: constructing a state space probability model of quality pattern dynamic motion equation; calculating a probability density function distribution of a quality pattern according to the probability model; performing optimized learning on parameters of the state space probability model of quality pattern dynamic motion equation according to the probability density function distribution, to obtain optimal model parameters and an optimized state space probability model of quality-pattern dynamic motion equation; and performing online prediction on product quality indicators based on the optimized state space probability model. The invention can implement online prediction of product quality, and perform online regulation on product quality by using the analytical relationship between the control input and the quality pattern, to ensure that the product quality remains at an optimal level.

9 Claims, 3 Drawing Sheets

REAL-TIME PREDICTION AND REGULATION METHODS AND SYSTEMS OF PRODUCT QUALITY BASED ON PROCESS DYNAMIC PATTERN

This application claims priority to Chinese Patent Application No. CN 202210826869.6, filed on Jul. 14, 2022, which is incorporated by reference for all purposes as if fully set forth herein.

FIELD OF THE INVENTION

The present invention belongs to the field of product quality management and control technologies, and specifically to real-time prediction and regulation methods and systems of product quality based on a process dynamic pattern.

DESCRIPTION OF THE RELATED ART

To vigorously develop industry, Germany has proposed "Industry 4.0" and China has proposed the strategy of "Made in China 2025", clearly proposing to adhere to the unity of intelligent manufacturing and improving product quality. In the context of rapid global development and high-speed competition, product quality determines the life of products and is directly related to the comprehensive economic benefits of factories. High-level product quality has become the foundation of enterprises in foreign markets and the basis of development.

In actual production, real-time access to product quality helps production personnel to adjust process variables in time and better control production processes to ensure product quality. However, since product quality cannot be detected online, it is often necessary to predict product quality by modeling. Currently, modeling methods mainly include mechanistic modeling and data-driven modeling. A mechanistic model can reflect the dynamic characteristic relationship between product quality and process variables in industrial processes well and has strong interpretability. However, mechanistic modeling is costly and difficult, it is difficult to guarantee accuracy and reliability, and there are often problems such as low model accuracy and easy mismatch. Data-driven models do not need to focus on the inner mechanism of processes, have strong applicability, and can better reflect changes in product quality in actual processes. However, existing data-driven models are inadequate to portray the dynamic change characteristics of product quality and the stochastic characteristics of processes, are only applicable to open-loop systems, and cannot consider the influence of control inputs on changes in product quality.

SUMMARY OF THE INVENTION

Embodiments of the present invention provide real-time prediction and regulation methods and systems of product quality based on a process dynamic pattern, to resolve the problem in the prior art that existing data-driven models are inadequate to portray the dynamic change characteristics of product quality and the stochastic characteristics of processes, are only applicable to open-loop systems, and cannot consider the influence of control inputs on changes in product quality.

Embodiments of the present invention provide a real-time prediction method of product quality based on a process dynamic pattern. The method includes:

S1: constructing a state space probability model of quality pattern dynamic motion equation;

S2: calculating a probability density function distribution of a quality pattern according to the state space probability model of quality pattern dynamic motion equation;

S3: performing optimized learning on parameters of the state space probability model of quality pattern dynamic motion equation according to the probability density function distribution, to obtain optimal model parameters and an optimized state space probability model of quality pattern dynamic motion equation; and S4: performing online prediction on product quality indicators based on the optimized state space probability model of quality pattern dynamic motion equation, where the performing optimized learning on parameters of the state space probability model of quality pattern dynamic motion equation, to obtain optimal model parameters and an optimized state space probability model of quality pattern dynamic motion equation specifically includes the following steps:

S31: calculating an expectation of a maximum likelihood function according to a probability density function distribution of the quality pattern in a Gaussian distribution;

S32: calculating the optimal model parameters by using an expectation maximum likelihood algorithm; and S33: introducing the optimal model parameters into the constructed state space probability model of quality pattern dynamic motion equation, to obtain the optimized state space probability model of quality pattern dynamic motion equation.

Preferably, the state space probability model of quality pattern dynamic motion equation constructed in step S1 is a linear time-invariant system or a nonlinear time-variant system.

Preferably, a method for constructing a state space probability model of quality mode dynamic motion equation in step S1 includes:

establishing an analytical relationship between the process pattern and the control input, a static mapping relationship between the process pattern and the process variables, and a static mapping relationship between product quality and the process pattern by using a temporal dynamic relationship of the process pattern, to obtain the state space probability model of quality pattern dynamic motion equation, specifically denoted as follows:

$t_k = At_{k-1} + Bu_{k-1} + w_k,$ $x_k = Qt_k + e_k,$ and $y_k = Ct_k + \varepsilon_k,$ where $t_k$ is the process pattern, $x_k$ is the process variable, $y_k$ is the product quality, $u_k$ is the control input, A, B, Q, and C are the model parameters requiring optimized learning, $w_k$, $e_k$, and $\varepsilon_k$ denote noise, and k=0, 1, 2, ..., N, denoting different sampling moments.

Preferably, a type of the noise $w_k$, $e_k$, and $\varepsilon_k$ in the state space probability model of quality pattern dynamic motion equation is selected from independent and identically distributed Gaussian noise, Poisson noise, multiplicative noise, salt-and-pepper noise, and gamma distribution noise.

Preferably, the calculating a probability density function distribution of a quality pattern in step S2 specifically includes the following steps:

S21: setting a probability density function distribution of an initial process pattern $t_0$ to:

$$p(t_0) = \frac{1}{\sqrt{\det(2\pi H_0)}} \times \exp\left\{-\frac{1}{2}(t_0 - h_0)^T H_0^{-1}(t_0 - h_0)\right\};$$

S22: calculating a conditional probability density function of the quality pattern by using a transform property of the Gaussian distribution, that is:

$$p(t_k \mid t_{k-1}, u_{k-1}) = \frac{1}{\sqrt{\det(2\pi\Phi_w)}} \times \exp\left\{-\frac{1}{2}(t_k - At_{k-1} - Bu_{k-1})^T \Phi_w^{-1}(t_k - At_{k-1} - Bu_{k-1})\right\},$$

$$p(x_k \mid t_k) = \frac{1}{\sqrt{\det(2\pi\Phi_e)}} \times \exp\left\{-\frac{1}{2}(x_k - Qt_k)^T \Phi_e^{-1}(x_k - Qt_k)\right\}, \text{ and}$$

$$p(y_k \mid t_k) = \frac{1}{\sqrt{\det(2\pi\Phi_\varepsilon)}} \times \exp\left\{-\frac{1}{2}(y_k - Ct_k)^T \Phi_\varepsilon^{-1}(y_k - Ct_k)\right\},$$

where $h_0$ is a mean value of the Gaussian distribution, $H_0$ is a variance of the Gaussian distribution, $t_k$ is the process pattern, $x_k$ is a process variable, $y_k$ is product quality, $u_k$ is a control input, A, B, Q, and C are the model parameters requiring optimized learning, $w_k$, $e_k$, and $\varepsilon_k$ denote noises, independent and identically distributed Gaussian noises with a mean value being zero and variances being respectively $\Phi_w$, $\Phi_e$, and $\Phi_E$ are chosen here, and k=0, 1, 2, . . . , N, denoting different sampling moments.

Preferably, a method of the optimized learning in step S3 is selected from an expectation maximum likelihood algorithm, a genetic algorithm, a particle swarm optimization algorithm, a simulated annealing algorithm, a greedy algorithm, and a neighborhood search algorithm.

Preferably, a method for performing online prediction on product quality indicators in step S4 is selected from a Kalman filter method, an iterative least squares method, a maximum a posteriori estimation method, a polynomial interpolation method, and a finite impulse response method.

Preferably, the performing online prediction on product quality indicators based on the optimized state space probability model of quality pattern dynamic motion equation in step S4 specifically includes the following steps:

S41: designing a real-time prediction method of the product quality indicators, where the online prediction of the product quality indicators includes:

$$p(t_k^{new} \mid x_{0:k}^{new}, u_{0:k}^{new}) = N(\hat{g}_k, \hat{G}_k),$$

$$\hat{g}_k = A^{new} g_{k-1}^{[<]BEGINITALm} + B^{new} u_{k-1}^{new} + \hat{K}[x_k^{new} - Q^{new}(A^{new} g_{k-1}^{[<]BEGINITALm} + B^{new} u_{k-1}^{new})],$$

$$\hat{G}_k = (I - \hat{K}Q^{new})(A^{new}\hat{G}_{k-1}A^{newT} + \Phi_w^{new}),$$

$$\hat{K} = (A^{new}\hat{G}_{k-1}A^{newT} + \Phi_w^{new})Q^{newT}[Q^{new}(A^{new}\hat{G}_{k-1}A^{newT} + \Phi_w^{new})Q^{newT} + \Phi_e^{new}]^{-1},$$

$$\hat{g}_0 = h_0^{new} + H_0^{new}Q^{newT}(Q^{new}H_0^{new}Q^{newT} + \Phi_e^{new})^{-1}(x_0^{new} - Q^{new}h_0^{new}), \text{ and}$$

$$\hat{G}_0 = H_0^{new} - H_0^{new}Q^{newT}(Q^{new}H_0^{new}Q^{newT} + \Phi_e^{new})^{-1}Q^{new}H_0^{new}; \text{ and}$$

S42: performing the online prediction on the product quality indicators, where online predicted values of the product quality indicators are:

$$y_k^{new} = C^{new}t_k^{new},$$

where $h_0^{new}$ is an optimized mean value of the Gaussian distribution, $H_0^{new}$ is an optimized variance of the Gaussian distribution, $t_k^{new}$ is an optimized process pattern, $x_k^{new}$ is an optimized process variable, $u_k^{new}$ is an optimized control input, $A^{new}$, $B^{new}$, $Q^{new}$, and $C^{new}$ are the optimized model parameters, $\Phi_w^{new}$, $\Phi_e^{new}$, and $\Phi_\varepsilon^{new}$, are optimized variances of Gaussian noises $w_k$, $e_k$, and $\varepsilon_k$, $g_k$ is a mean value of $t_k^{new}$, $G_k$ is a variance of $t_k^{new}$, K is a filter gain, I is an identity matrix, and k=0, 1, 2, . . . , N, denoting different sampling moments.

The embodiments of the present invention further provide an online regulation method of product quality based on a process dynamic pattern. The method includes the real-time prediction method of product quality based on a process dynamic pattern, and performing online regulation on product quality indicators based on an optimized state space probability model of quality pattern dynamic motion equation.

Preferably, any one of pattern feedback control, PID control, fuzzy control, adaptive control, prediction control, and robust control is used in the online regulation method.

Preferably, the performing online regulation on product quality indicators based on an optimized state space probability model of quality pattern dynamic motion equation specifically includes the following steps:

step 1: calculating an optimal reference input $r(y_k^{opt})$ according to expected product quality indicators;

step 2: designing a quality pattern control strategy as follows:

$$u_k^{new} = \mathcal{K} t_k^{new} + r(y_k^{opt});$$

step 3: introducing the quality pattern control strategy into the optimized state space probability model of quality pattern dynamic motion equation, to obtain a closed-loop motion equation of a process pattern:

$$t_k^{new} = (A^{new} + B^{new}\mathcal{K})t_{k-1}^{new} + B^{new}r(y_{k-1}^{opt}) + w_k^{new};$$

and step 4: calculating a control strategy gain $\mathcal{K}$ ensuring that the closed-loop motion equation is stable, to implement online regulation of product quality indicators, where $r(y_k^{opt})$ is the optimal reference input, $t_k^{new}$ is an optimized process pattern, $u_k^{new}$ is an optimized control input, $A^{new}$ and $B^{new}$ are optimized model parameters, $\mathcal{K}$ is the control strategy gain, $w_k^{new}$ is optimized Gaussian noise, and k=0, 1, 2, . . . N, denoting different sampling moments.

The embodiments of the present invention provide a real-time prediction system of product quality based on a process dynamic pattern. The system includes:

a motion equation construction module, configured to construct a state space probability model of quality pattern dynamic motion equation;

an optimized learning module, configured to calculate a probability density function distribution of a quality pattern according to the state space probability model of quality pattern dynamic motion equation; and perform optimized learning on parameters of the state space probability model of quality pattern dynamic motion equation according to the probability density function distribution, to obtain optimal model parameters and an optimized state space probability model of quality pattern dynamic motion equation; and an online prediction module, configured to perform online prediction on product quality indicators based on the optimized state space probability model of quality pattern dynamic motion equation.

Compared with the prior art, the present invention has the following beneficial effects:

Embodiments of the present invention provide real-time prediction and regulation methods and systems of product quality based on a process dynamic pattern. In the present invention, by means of a Bayesian network, a quality pattern dynamic online prediction method under supervised learning is proposed from the perspective of probability, and a probability dynamic timing motion equation between a quality pattern and process variables and control inputs is established, so that online prediction of product quality can be implemented, and online regulation can be performed on the product quality by using an analytical relationship between the control input and the quality pattern, to ensure that the product quality remains at an optimal level.

BRIEF DESCRIPTION OF THE DRAWINGS

To describe the technical solutions in the embodiments of the present invention or in the prior art more clearly, the accompanying drawings that need to be used in the embodiments are briefly described below. The features and advantages of the present invention will be more clearly understood by referring to the accompanying drawings, which are schematic and should not be construed as limiting the present invention in any way. A person of ordinary skill in the art can obtain other accompanying drawings without creative efforts based on these accompanying drawings. Where.

DETAILED DESCRIPTION OF THE PREFERRED EMBODIMENTS

To make the objectives, technical solutions, and advantages of the embodiments of the present invention clearer, the following clearly and completely describes the technical solutions in embodiments of the present invention with reference to the accompanying drawings in embodiments of the present invention. Apparently, the described embodiments are some rather than all of the embodiments of the present invention.

All other embodiments obtained by persons of ordinary skill in the art based on the embodiments of the present invention without creative efforts shall fall within the protection scope of the present invention.

Embodiment 1

Figure 1:
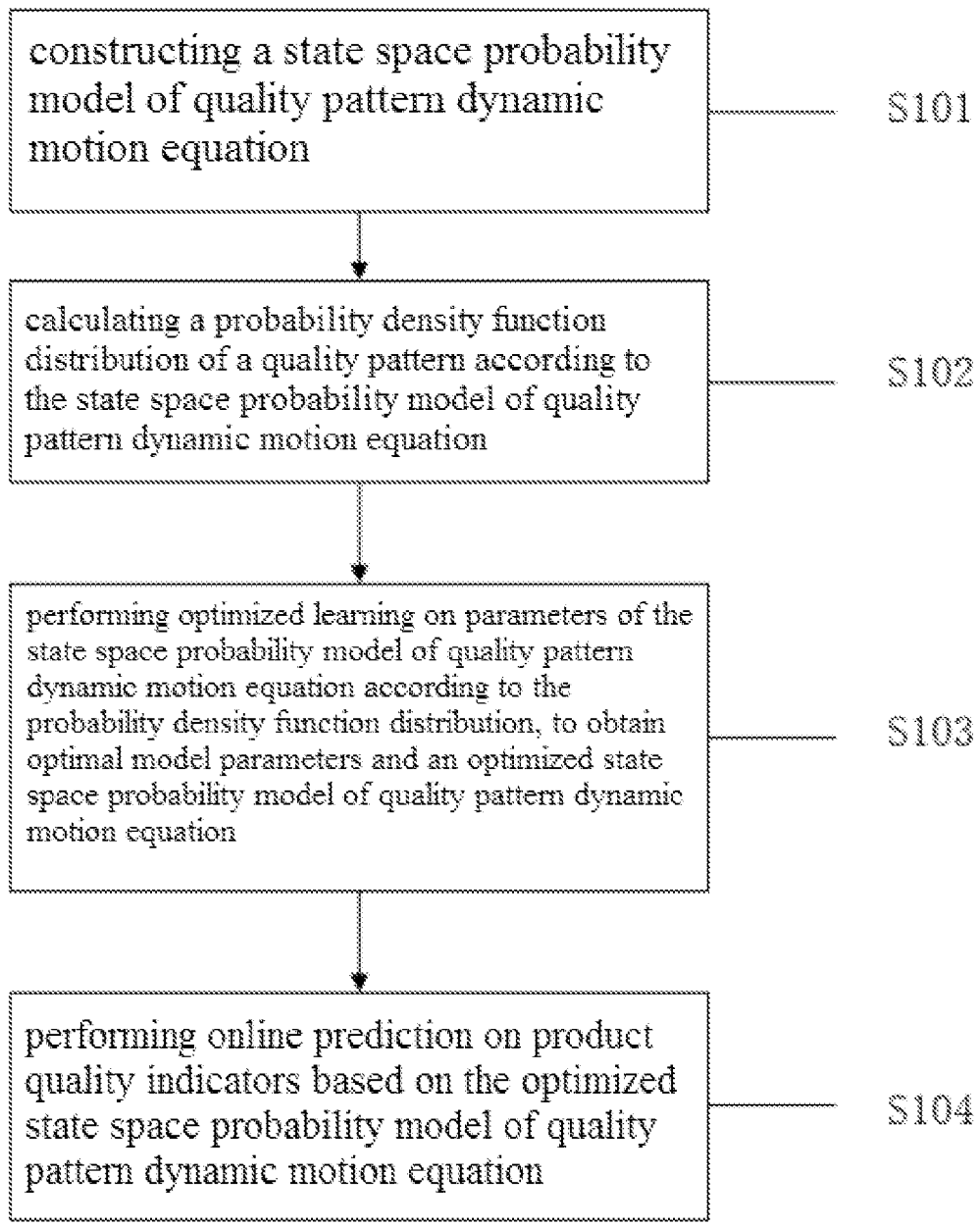
FIG. 1 is a flowchart of a real-time prediction method of product quality based on a process dynamic pattern according to an embodiment of the present invention.

As shown in FIG. 1, a real-time prediction method of product quality based on a process dynamic pattern provided in embodiments of the present invention includes the following steps.

S101: Construct a state space probability model of quality pattern dynamic motion equation.

S102: Calculate a probability density function distribution of a quality pattern according to the state space probability model of quality pattern dynamic motion equation.

S103: Perform optimized learning on parameters of the state space probability model of quality pattern dynamic motion equation according to the probability density function distribution, to obtain optimal model parameters and an optimized state space probability model of quality pattern dynamic motion equation.

S104: Perform online prediction on product quality indicators based on the optimized state space probability model of quality pattern dynamic motion equation.

The performing optimized learning on parameters of the state space probability model of quality pattern dynamic motion equation, to obtain optimal model parameters and an optimized state space probability model of quality pattern dynamic motion equation specifically includes the following steps.

S1031: Calculate an expectation of a maximum likelihood function according to a probability density function distribution of the quality pattern in a Gaussian distribution.

S1032: Calculate the optimal model parameters by using an expectation maximum likelihood algorithm.

S1033: Introduce the optimal model parameters into the constructed state space probability model of quality pattern dynamic motion equation, to obtain the optimized state space probability model of quality pattern dynamic motion equation.

The present invention constructs a probability dynamic timing motion equation between a quality pattern and process variables and control inputs, can implement online prediction of product quality, and can perform online regulation on the product quality by using an analytical relationship between the control input and the quality pattern, to ensure that the product quality remains at an optimal level.

Further, the state space probability model of quality pattern dynamic motion equation constructed in step S101 is a linear time-invariant system or a nonlinear time-variant system.

A method for constructing a state space probability model of quality pattern dynamic motion equation in step S101 is:
establishing an analytical relationship between the process pattern and the control input, a static mapping relationship between the process pattern and the process variables, and a static mapping relationship between product quality and the process pattern by using a temporal dynamic relationship of the process pattern, to obtain the state space probability model of quality pattern dynamic motion equation, specifically denoted as follows:

$$t_k = At_{k-1} + Bu_{k-1} + w_k,$$

$$x_k = Qt_k + e_k, \text{ and}$$

$$y_k = Ct_k + \varepsilon_k,$$

where $t_k$ is the process pattern, $x_k$ is the process variable, $y$ is the product quality, $u_k$ is the control input, A, B, Q, and C are the model parameters requiring optimized learning, $w_k$, $e_k$, and $\varepsilon_k$ denote noise, and $k = 0, 1, 2, \ldots, N$, denoting different sampling moments.

A type of the noise $w_k$, $e_k$, and $\varepsilon_k$ in the state space probability model of quality pattern dynamic motion equation is selected from independent and identically distributed Gaussian noise, Poisson noise, multiplicative noise, salt-and-pepper noise, and gamma distribution noise.

Further, the calculating a probability density function distribution of a quality pattern in step S102 specifically includes the following steps.

S1021: Set a probability density function distribution of an initial process pattern $t_0$ to:

$$p(t_0) = \frac{1}{\sqrt{\det(2\pi H_0)}} \times \exp\left\{-\frac{1}{2}(t_0-h_0)^T H_0^{-1}(t_0-h_0)\right\}.$$

S1022: Calculate a conditional probability density function of the quality pattern by using a transform property of the Gaussian distribution, that is:

$$p(t_k \mid t_{k-1}, u_{k-1}) =$$
$$\frac{1}{\sqrt{\det(2\pi\Phi_w)}} \times \exp\left\{-\frac{1}{2}(t_k - At_{k-1} - Bu_{k-1})^T \Phi_w^{-1}(t_k - At_{k-1} - Bu_{k-1})\right\},$$

$$p(x_k \mid t_k) = \frac{1}{\sqrt{\det(2\pi\Phi_e)}} \times \exp\left\{-\frac{1}{2}(x_k - Qt_k)^T \Phi_e^{-1}(x_k - Qt_k)\right\}, \text{ and}$$

$$p(y_k \mid t_k) = \frac{1}{\sqrt{\det(2\pi\Phi_\varepsilon)}} \times \exp\left\{-\frac{1}{2}(y_k - Ct_k)^T \Phi_\varepsilon^{-1}(y_k - Ct_k)\right\},$$

where $h_0$ is a mean value of the Gaussian distribution, $H_0$ is a variance of the Gaussian distribution, $t_k$ is the process pattern, $x_k$ is a process variable, y is product quality, $u_k$ is a control input, A, B, Q, and C are the model parameters requiring optimized learning, $w_k$, $e_k$, and $\varepsilon_k$ denote noises, independent and identically distributed Gaussian noises with a mean value being zero and variances being respectively OW, $\Phi_e$, and $\Phi_E$ are chosen here, and k=0, 1, 2, . . . , N, denoting different sampling moments.

Further, a method of the optimized learning in step S103 is selected from an expectation maximum likelihood algorithm, a genetic algorithm, a particle swarm optimization algorithm, a simulated annealing algorithm, a greedy algorithm, and a neighborhood search algorithm.

The performing optimized learning on parameters of the state space probability model of quality pattern dynamic motion equation, to obtain optimal model parameters and an optimized state space probability model of quality pattern dynamic motion equation in step S103 specifically includes the following steps.

S1031: Calculate an expectation of a maximum likelihood function according to a conditional probability density function of the quality pattern in a Gaussian distribution, that is:

$$E[\ln p(x_{0:N}, y_{0:N}, u_{0:N}, t_{0:N})] = -\frac{1}{2}\{\ln|H_0| + E(t_0^T H_0^{-1} t_0) -$$
$$E(t_0^T) H_0^{-1} h_0 - h_0^T H_0^{-1} E(t_0) + h_0^T H_0^{-1} h_0\} - \frac{1}{2}\{(N+1)\ln|\Phi_e| +$$
$$\sum_{k=0}^{N}\left[x_k^T \Phi_e^{-1} x_k - x_k^T \Phi_e^{-1} QE(t_k) - E(t_k^T) Q^T \Phi_e^{-1} x_k + E(t_k^T Q^T \Phi_e^{-1} Qt_k)\right]\} -$$
$$\frac{1}{2}\left\{(N+1)\ln|\Phi_\varepsilon| + \sum_{k=0}^{N}\left[y_k^T \Phi_\varepsilon^{-1} y_k - y_k^T \Phi_\varepsilon^{-1} CE(t_k) - E(t_k^T) C^T \Phi_\varepsilon^{-1} y_k + E(t_k^T C^T \Phi_\varepsilon^{-1} C t_k)\right]\right\} - \frac{1}{2}\left\{N \ln|\Phi_w| + \sum_{k=1}^{N}\left[E(t_k^T \Phi_w^{-1} t_k) - \right.\right.$$

-continued
$$E(t_k^T \Phi_w^{-1} A t_{k-1}) - E(t_k^T) \Phi_w^{-1} B u_{k-1} - E(t_{k-1}^T A^T \Phi_w^{-1} t_k) +$$
$$E(t_{k-1}^T A^T \Phi_w^{-1} A t_{k-1}) + E(t_{k-1}^T) A^T \Phi_w^{-1} B u_{k-1} - u_{k-1}^T B^T \Phi_w^{-1} E(t_k) +$$
$$u_{k-1}^T B^T \Phi_w^{-1} A E(t_{k-1}) + u_{k-1}^T B^T \Phi_w^{-1} B u_{k-1}]\} - \frac{1}{2}(N+1)(m+n+f)\ln(2\pi)$$

S1032: Calculate the optimal model parameters by using an expectation maximum likelihood algorithm, that is:

$$h_0^{new} = E(t_0), \quad H_0^{new} = E(t_0 t_0^T) - E(t_0)E(t_0^T),$$
$$A^{new} = \sum_{k=1}^{N}\left[E(t_k t_{k-1}^T) - B u_{k-1} E(t_{k-1}^T)\right]\left[\sum_{k=1}^{N} E(t_{k-1} t_{k-1}^T)\right]^{-1},$$
$$B^{new} = \sum_{k=1}^{N}\left[E(t_k) u_{k-1}^T - AE(t_{k-1}) u_{k-1}^T\right]\left[\sum_{k=1}^{N} u_{k-1} u_{k-1}^T\right]^{-1},$$
$$Q^{new} = \sum_{k=0}^{N}\left[x_k E(t_k^T)\right]\left[\sum_{k=0}^{N} E(t_k t_k^T)\right]^{-1},$$
$$C^{new} = \sum_{k=0}^{N}\left[y_k E(t_k^T)\right]\left[\sum_{k=0}^{N} E(t_k t_k^T)\right]^{-1},$$
$$\Phi_w^{new} = \frac{1}{N}\sum_{k=1}^{N}\left[E(t_k t_k^T) + AE(T_{k-1} t_{k-1}^T) A^T + \right.$$
$$B u_{k-1} u_{k-1}^T B^T - E(t_k t_{k-1}^T) A^T - AE(t_{k-1} t_k^T) - E(t_k) u_{k-1}^T B^T -$$
$$\left. B u_{k-1} E(t_k^T) + AE(t_{k-1}) u_{k-1}^T B^T + B u_{k-1} E(t_{k-1}^T) A^T\right],$$
$$\Phi_e^{new} = \frac{1}{N+1}\sum_{k=0}^{N}\left[x_k x_k^T - QE(t_k) x_k^T - x_k E(t_k^T) Q^T + QE(t_k t_k^T) Q^T\right], \text{ and}$$
$$\Phi_\varepsilon^{new} = \frac{1}{N+1}\sum_{k=0}^{N}\left[y_k y_k^T - CE(t_k) y_k^T - y_k E(t_k^T) C^T + CE(t_k t_k^T) C^T\right].$$

S1033: Introduce the optimal model parameters into the constructed state space probability model of quality pattern dynamic motion equation, to obtain the optimized state space probability model of quality pattern dynamic motion equation.

where $h_0$ is a mean value of the Gaussian distribution, $H_0$ is a variance of the Gaussian distribution, $t_k$ is the process pattern, $x_k$ is a process variable, $y_k$ is product quality, $u_k$ is a control input, A, B, Q, and C are the model parameters requiring optimized learning, $\Phi_w$, $\Phi_e$, and $\Phi_E$ are respectively variances of Gaussian noise $w_k$, $e_k$, and $\varepsilon_k$, and k=0, 1, 2, . . . , N, denoting different sampling moments. N is a learning duration, n is a quantity of process variables, m is a quantity of process patterns, f is a quantity of product quality, $h_0^{new}$ is an optimized mean value of the Gaussian distribution, $H_0^{new}$ is an optimized variance of the Gaussian distribution, $A^{new}$, $B^{new}$, $Q^{new}$, and $C^{new}$ are the optimized model parameters, and $\Phi_w^{new}$, $\Phi_w^{new}$, and $\Phi_\varepsilon^{new}$ are optimized variances of Gaussian noise.

Further, it is designed that a method for performing real-time prediction on product quality indicators in step S104 is any one of a Kalman filter method, an iterative least squares method, a maximum a posteriori estimation method, a polynomial interpolation method, and a finite impulse response method.

The performing online prediction on product quality indicators based on the optimized state space probability model of quality pattern dynamic motion equation in step S104 specifically includes the following steps.

S1041: Design a real-time prediction method of the product quality indicators, where the online prediction of the product quality indicators includes:

$$p(t_k^{new} \mid x_{0:k}^{new}, u_{0:k}^{new}) = N(\hat{g}_k, \hat{G}_k),$$

$$\hat{g}_k = A^{new} g_{k-1}^{[<]\text{BEGINITAL}m} + B^{new} u_{k-1}^{new} + \hat{K}[x_k^{new} - Q^{new}(A^{new} g_{k-1}^{[<]\text{BEGINITAL}m} + B^{new} u_{k-1}^{new})],$$

$$\hat{G}_k = (I - \hat{K} Q^{new})(A^{new} \hat{G}_{k-1} A^{newT} + \Phi_w^{new}),$$

$$\hat{K} = (A^{new} \hat{G}_{k-1} A^{newT} + \Phi_w^{new}) Q^{newT} [Q^{new}(A^{new} G_{k-1} A^{newT} + \Phi_w^{new}) Q^{newT} + \Phi_e^{new}]^{-1},$$

$$\hat{g}_0 = h_0^{new} + H_0^{new} Q^{newT}(Q^{new} H_0^{new} Q^{newT} + \Phi_e^{new})^{-1}(x_0^{new} - Q^{new} h_0^{new}), \text{ and}$$

$$\hat{G}_0 = H_0^{new} - H_0^{new} Q^{newT}(Q^{new} H_0^{new} Q^{newT} + \Phi_e^{new})^{-1} Q^{new} H_0^{new}; \text{ and}$$

S1042: Perform the online prediction on the product quality indicators, where online predicted values of the product quality indicators are:

$$y_k^{new} = C^{new} t_k^{new},$$

where $h_0^{new}$ is an optimized mean value of the Gaussian distribution, $H_0^{new}$ is an optimized variance of the Gaussian distribution, $t_k^{new}$ is an optimized process pattern, $x_k^{new}$ is an optimized process variable, $u_k^{new}$ is an optimized control input, $A^{new}$, $B^{new}$, $Q^{new}$, and $C^{new}$ are the optimized model parameters, $\Phi_w^{new}$, $\Phi_w^{new}$, and $\Phi_\varepsilon^{new}$ are optimized variances of Gaussian noises $w_k$, $e_k$, and $\varepsilon_k$, $g_k$ is a mean value of $t_k^{new}$, $G_k$ is a variance of $t_k^{new}$, K is a filter gain, I is an identity matrix, and k=0, 1, 2, . . . , N, denoting different sampling moments.

Figure 2:
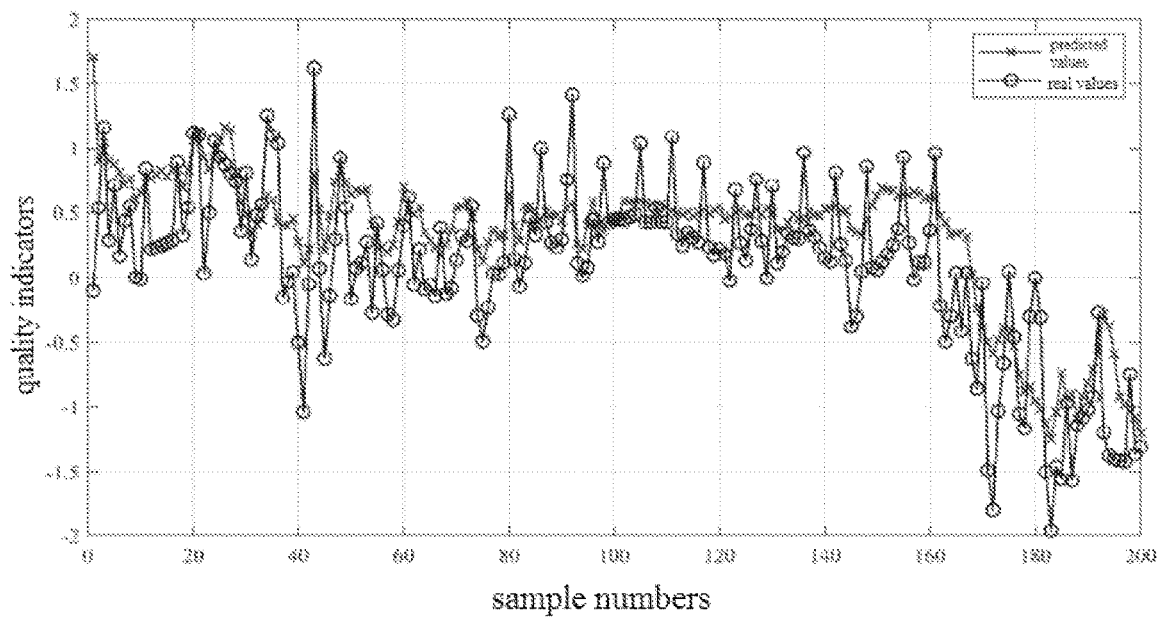
FIG. 2 is a diagram of errors in quality prediction according to an embodiment of the present invention.

A diagram of prediction errors of product quality may be obtained through computer simulation, as shown in FIG. 2.

Embodiment 2

The embodiments of the present invention provide an online regulation method of product quality based on a process dynamic pattern. The method includes the foregoing real-time prediction method of product quality based on a process dynamic pattern, and performing online regulation on product quality indicators based on an optimized state space probability model of quality pattern dynamic motion equation.

Further, any one of pattern feedback control, PID control, fuzzy control, adaptive control, prediction control, and robust control is used in the online regulation method.

Further, the performing online regulation on product quality indicators based on an optimized state space probability model of quality pattern dynamic motion equation specifically includes the following steps:

Step 1: Calculate an optimal reference input $r(y_k^{opt})$ according to expected product quality indicators.

Step 2: Design a quality pattern control strategy as follows:

$$u_k^{new} = \mathcal{K} t_k^{new} + r(y_k^{opt});$$

Step 3: Introduce the quality pattern control strategy into the optimized state space probability model of quality pattern dynamic motion equation, to obtain a closed-loop motion equation of a process pattern:

$$t_k^{new} = (A^{new} + B^{new} \mathcal{K}) t_{k-1}^{new} + B^{new} r(y_{k-1}^{opt}) + w_k^{new}$$

Step 4: Calculate a control strategy gain $\mathcal{K}$ ensuring that the closed-loop motion equation is stable, to implement online regulation of product quality indicators, where $r(y_k^{opt})$ is the optimal reference input, $t_k^{new}$ is an optimized process pattern, $u_k^{new}$ is an optimized control input, $A^{new}$ and $B^{new}$ are optimized model parameters, $\mathcal{K}$ is the control strategy gain, $w_k^{new}$ is optimized Gaussian noise, and k=0, 1, 2, . . . , N, denoting different sampling moments.

Figure 3:
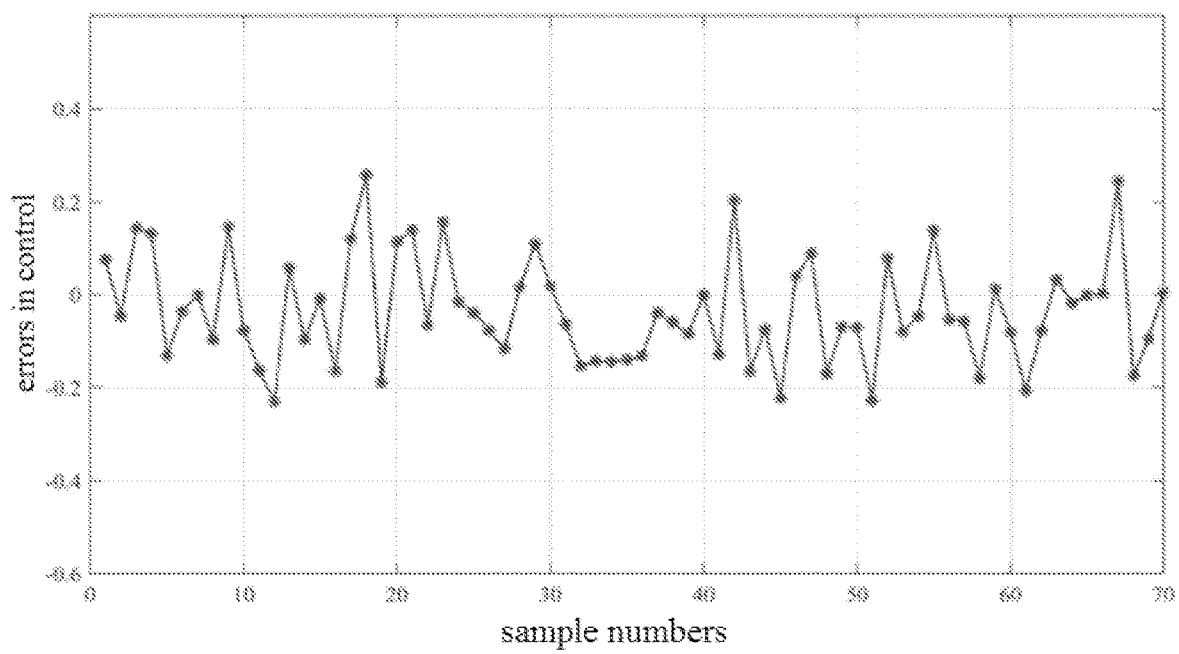
FIG. 3 is a diagram of errors in quality control according to an embodiment of the present invention.

A diagram of control errors of product quality may be obtained through computer simulation, as shown in FIG. 3.

Embodiment 3

Figure 4:
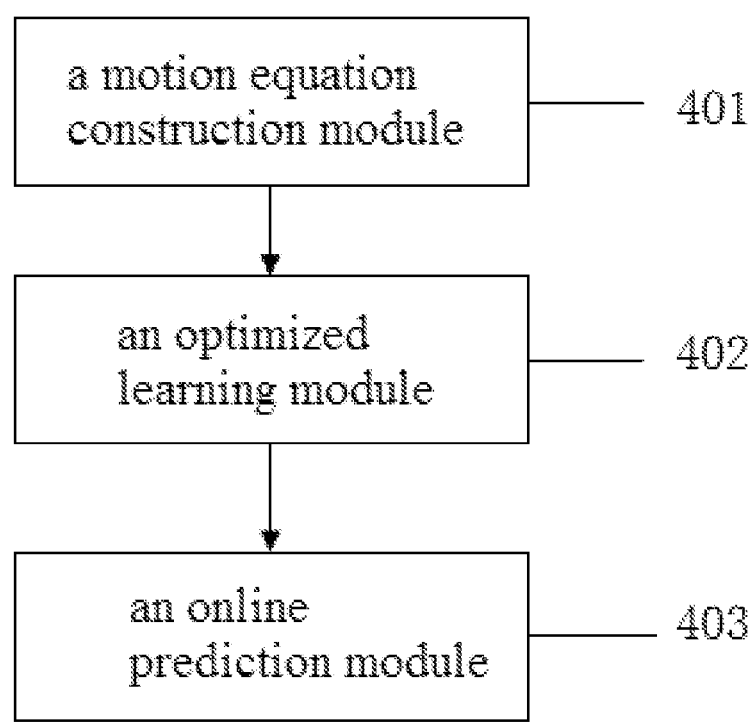
FIG. 4 is a block diagram of a real-time prediction system of product quality based on a process dynamic pattern according to an embodiment of the present invention.

The embodiments of the present invention provide a real-time prediction system of product quality based on a process dynamic pattern. As shown in FIG. 4, the system includes:

a motion equation construction module 401, configured to construct a state space probability model of quality pattern dynamic motion equation;

an optimized learning module 402, configured to calculate a probability density function distribution of a quality pattern according to the state space probability model of quality pattern dynamic motion equation; and perform optimized learning on parameters of the state space probability model of quality pattern dynamic motion equation according to the probability density function distribution, to obtain optimal model parameters and an optimized state space probability model of quality pattern dynamic motion equation; and an online prediction module 403, configured to perform online prediction on product quality indicators based on the optimized state space probability model of quality pattern dynamic motion equation.

The system is configured to implement the real-time prediction method of product quality based on a process dynamic pattern in Embodiment 1 above. To avoid redundancy, details are not described again herein.

It should be noted that, the above description only provides preferred embodiments of the present invention and the employed technical principles. It should be appreciated by those skilled in the art that the present invention is not limited to the particular embodiments described herein. Those skilled in the art may make various obvious changes, readjustments, and replacements without departing from the scope of protection of the present invention. Therefore, while the present invention is illustrated in detail in combination with the above embodiments, the present invention is not only limited to the above embodiments, and can further include more other equivalent embodiments without departing from the concept of the present invention. The scope of the present invention is defined by the scope of the appended claims.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A real-time prediction method of product quality based on a process dynamic pattern, comprising:
    S1: constructing a state space probability model of quality pattern dynamic motion equation;
    S2: calculating a probability density function distribution of a quality pattern according to the state space probability model of quality pattern dynamic motion equation;
    S3: performing optimized learning on parameters of the state space probability model of quality pattern dynamic motion equation according to the probability density function distribution, to obtain optimal model parameters and an optimized state space probability model of quality pattern dynamic motion equation; and
    S4: performing online prediction on product quality indicators based on the optimized state space probability model of quality pattern dynamic motion equation,
    wherein the performing optimized learning on parameters of the state space probability model of quality pattern dynamic motion equation, to obtain optimal model parameters and an optimized state space probability model of quality pattern dynamic motion equation specifically comprises steps of:
    S31: calculating an expectation of a maximum likelihood function according to a probability density function distribution of the quality pattern in a Gaussian distribution;
    S32: calculating the optimal model parameters by using an expectation maximum likelihood algorithm; and
    S33: introducing the optimal model parameters into the constructed state space probability model of quality pattern dynamic motion equation, to obtain the optimized state space probability model of quality pattern dynamic motion equation,
    wherein a method of the optimized learning in step S3 is selected from the group consisting of an expectation maximum likelihood algorithm, a genetic algorithm, a particle swarm optimization algorithm, a simulated annealing algorithm, a greedy algorithm, and a neighborhood search algorithm;
    wherein a method for performing online prediction on product quality indicators in step S4 is selected from the group consisting of a Kalman filter method, an iterative least square method, a maximum a posteriori estimation method, a polynomial interpolation method, and a finite impulse response method; and
    wherein the real-time prediction method further comprises a Bayesian network; and the real-time prediction method implements online prediction and performs online regulation on product quality indicators to ensure that product quality remains at an optimal level.

2. The real-time prediction method of product quality based on a process dynamic pattern according to claim 1, wherein the state space probability model of quality pattern dynamic motion equation constructed in step S1 is a linear time-invariant system or a nonlinear time-variant system.

3. The real-time prediction method of product quality based on a process dynamic pattern according to claim 1, wherein a method for constructing a state space probability model of quality pattern dynamic motion equation in step S1 comprises:
    establishing an analytical relationship between a process pattern and a control input, a static mapping relationship between the process pattern and process variables, and a static mapping relationship between product quality and the process pattern by using a temporal dynamic relationship of the process pattern, to obtain the state space probability model of quality pattern dynamic motion equation, specifically denoted as follows:

$$t_k = At_{k-1} + Bu_{k-1} + w_k,$$

$$x_k = Qt_k + e_k, \text{ and}$$

$$y_k = Ct_k + \varepsilon_k,$$

wherein $t_k$ is the process pattern, xx is the process variable, $y_k$ is the product quality, $u_k$ is the control input, A, B, Q, and C are the model parameters requiring optimized learning, $w_k$, $e_k$, and $\varepsilon_k$ denote noise, and k=0, 1, 2, ..., N, denoting different sampling moments.

4. The real-time prediction method of product quality based on a process dynamic pattern according to claim 3, wherein a type of the noise $w_k$, $e_k$, and $\varepsilon_k$ in the state space probability model of quality pattern dynamic motion equation is selected from independent and identically distributed Gaussian noise, Poisson noise, multiplicative noise, salt-and-pepper noise, and gamma distribution noise.

5. The real-time prediction method of product quality based on a process dynamic pattern according to claim 1, wherein the calculating a probability density function distribution of a quality pattern in step S2 specifically comprises steps of:
    S21: setting a probability density function distribution of an initial process pattern $t_0$ to:

$$p(t_0) = \frac{1}{\sqrt{\det(2\pi H_0)}} \times \exp\left\{-\frac{1}{2}(t_0 - h_0)^T H_0^{-1}(t_0 - h_0)\right\};$$

S22: calculating a conditional probability density function of the quality pattern by using a transform property of the Gaussian distribution, that is:

$$p(t_k \mid t_{k-1}, u_{k-1}) =$$

$$\frac{1}{\sqrt{\det(2\pi\Phi_w)}} \times \exp\left\{-\frac{1}{2}(t_k - At_{k-1} - Bu_{k-1})^T \Phi_w^{-1}(t_k - At_{k-1} - Bu_{k-1})\right\},$$

$$p(x_k \mid t_k) = \frac{1}{\sqrt{\det(2\pi\Phi_e)}} \times \exp\left\{-\frac{1}{2}(x_k - Qt_k)^T \Phi_e^{-1}(x_k - Qt_k)\right\}, \text{ and}$$

$$p(y_k \mid t_k) = \frac{1}{\sqrt{\det(2\pi\Phi_\varepsilon)}} \times \exp\left\{-\frac{1}{2}(y_k - Ct_k)^T \Phi_\varepsilon^{-1}(y_k - Ct_k)\right\},$$

wherein $h_0$ is a mean value of the Gaussian distribution, $H_0$ is a variance of the Gaussian distribution, $t_k$ is the process pattern, $x_k$ is a process variable, $y_k$ is product quality, $u_k$ is a control input, A, B, Q, and C are the model parameters requiring optimized learning, $w_k$, $e_k$, and $\varepsilon_k$ denote noises, independent and identically distributed Gaussian noises with a mean value being zero and variances being respectively $\Phi_w$, $\Phi_e$, and $\Phi_\varepsilon$ are chosen here, and k=0, 1, 2, ..., N, denoting different sampling moments.

6. The real-time prediction method of product quality based on a process dynamic pattern according to claim 1, wherein the performing online prediction on product quality indicators based on the optimized state space probability model of quality pattern dynamic motion equation in step S4 specifically comprises steps of:

S41: designing a real-time prediction method of the product quality indicators, wherein the online prediction of the product quality indicators comprises:

$$p(t_k^{new} \mid x_{0:k}^{new}, u_{0:k}^{new}) = N(\hat{g}_k, \hat{G}_k),$$

$$\hat{g}_k = A^{new} g_{k-1} + B^{new} u_{k-1}^{new} + \hat{K}[x_k^{new} - Q^{new}(A^{new} g_{k-1} + B^{new} u_{k-1}^{new})],$$

$$\hat{G}_k = (I - \hat{K} Q^{new})(A^{new} \hat{G}_{k-1} A^{newT} + \Phi_w^{new}),$$

$$\hat{K} = (A^{new} \hat{G}_{k-1} A^{newT} + \Phi_w^{new}) Q^{newT} [Q^{new}(A^{new} \hat{G}_{k-1} A^{newT} + \Phi_w^{new}) Q^{newT} + \Phi_e^{new}]^{-1},$$

$$\hat{g}_0 = h_0^{new} + H_0^{new} Q^{newT} (Q^{new} H_0^{new} Q^{newT} + \Phi_e^{new})^{-1}(x_0^{new} - Q^{new} h_0^{new}), \text{ and}$$

$$\hat{G}_0 = H_0^{new} - H_0^{new} Q^{newT} (Q^{new} H_0^{new} Q^{newT} + \Phi_e^{new})^{-1} Q^{new} H_0^{new}; \text{ and}$$

42: performing the online prediction on the product quality indicators, wherein online predicted values of the product quality indicators are:

$$y_k^{new} = C^{new} t_k^{new},$$

wherein $h_0^{new}$ is an optimized mean value of the Gaussian distribution, $H_0^{new}$ is an optimized variance of the Gaussian distribution, $t_k^{new}$ is an optimized process pattern, $x_k^{new}$ is an optimized process variable, $u_k^{new}$ is an optimized control input, $A^{new}$, $B^{new}$, $Q^{new}$, and $C^{new}$ are the optimized model parameters, $\Phi_w^{new}$, $\Phi_e^{new}$, and $\Phi_\varepsilon^{new}$ are optimized variances of Gaussian noises $w_k$, $e_k$, and $\varepsilon_k$, $g_k$ is a mean value of $t_k^{new}$, $G_k$ is a variance of $t_k^{new}$, K is a filter gain, I is an identity matrix, and k=0, 1, 2, ..., N, denoting different sampling moments.

7. An online regulation method of product quality based on a process dynamic pattern, comprising the real-time prediction method of product quality based on a process dynamic pattern according to claim 1, and performing online regulation on product quality indicators based on an optimized state space probability model of quality pattern dynamic motion equation.

8. The online regulation method of product quality based on a process dynamic pattern according to claim 7, wherein any one of pattern feedback control, PID control, fuzzy control, adaptive control, prediction control, and robust control is used in the online regulation method.

9. The online regulation method of product quality based on a process dynamic pattern according to claim 7, wherein the performing online regulation on product quality indicators based on an optimized state space probability model of quality pattern dynamic motion equation comprises steps of:

step 1: calculating an optimal reference input $r(y_k^{opt})$ according to expected product quality indicators;

step 2: designing a quality pattern control strategy as follows:

$$u_k^{new} = \mathcal{K} t_k^{new} + r(y_k^{opt});$$

step 3: introducing the quality pattern control strategy into the optimized state space probability model of quality pattern dynamic motion equation, to obtain a closed-loop motion equation of a process pattern:

$$t_k^{new} = (A^{new} + B^{new} \mathcal{K}) t_{k-1}^{new} + B^{new} r(y_{k-1}^{opt}) + w_k^{new};$$

and step 4: calculating a control strategy gain K ensuring that the closed-loop motion equation is stable, to implement online regulation of product quality indicators, wherein $r(y_k^{opt})$ is the optimal reference input, $t_k^{new}$ is an optimized process pattern, $u_k^{new}$ is an optimized control input, $A^{new}$ and $B^{new}$ are optimized model parameters, $\mathcal{K}$ is the control strategy gain, $w_k^{new}$ optimized Gaussian noise, and k=0, 1, 2, ..., N, denoting different sampling moments.

* * * * *